(12) United States Patent
Wernberg et al.

(10) Patent No.: US 6,381,946 B1
(45) Date of Patent: May 7, 2002

(54) TWO STAGE FUEL METERING SYSTEM FOR GAS TURBINE

(75) Inventors: Donald E. Wernberg, Rockford; Joel W. Kleckler, Rockton, both of IL (US)

(73) Assignee: Woodward Governor Company, Rockford, IL (US)

( * ) Notice: Subject to any disclaimer, the term of this patent is extended or adjusted under 35 U.S.C. 154(b) by 0 days.

(21) Appl. No.: 09/575,613

(22) Filed: May 22, 2000

(51) Int. Cl.$^7$ .................................................. F02C 9/26
(52) U.S. Cl. ..................................................... 60/39.281
(58) Field of Search .............................. 60/39.281, 734

(56) References Cited

U.S. PATENT DOCUMENTS

| | | | | |
|---|---|---|---|---|
| 4,760,662 A | * | 8/1988 | Dyer et al. | 60/39.281 |
| 4,794,755 A | * | 1/1989 | Hutto et al. | 90/39.281 |
| 5,088,278 A | * | 2/1992 | Smith et al. | 60/39.281 |
| 5,111,653 A | | 5/1992 | Leeson | 60/39.02 |
| 5,433,237 A | | 7/1995 | Kao et al. | 137/8 |
| 5,490,379 A | | 2/1996 | Wernberg et al. | 60/39.281 |
| 5,809,771 A | | 9/1998 | Wernberg | 60/39.094 |
| 5,873,351 A | | 2/1999 | Vars | 123/527 |

* cited by examiner

*Primary Examiner*—Louis J. Casaregola
(74) *Attorney, Agent, or Firm*—Leydig, Voit & Mayer, LTD (57) ABSTRACT

A novel two-stage fuel metering system is disclosed for metering the flown of fuel between a fuel supply and a combustion chamber of an engine the fuel in the supply being pressurized by a pump and delivered to the combustion chamber. The fuel metering system includes a first primary passageway for receiving fuel from a fuel supply and a second primary passageway fluidically connected to the first passageway for delivering fuel to a combustion chamber. A servo chamber is fluidically connected to both the first and second primary passageways and a servo valve is disposed between the first passageway and the servo chamber to selectively regulate the flow of fuel entering the chamber. A metering valve is disposed between the first and second passageways to regulate the flow of fuel from the first passageway to the second passageway the metering valve being biased to a closed position that obstructs the fuel flow. The metering valve further includes an actuating surface disposed in the chamber and responsive to the pressure in the chamber, wherein the metering valve is adapted to move from the closed position toward an open position in response to sufficient fuel pressure in the chamber. A conduit fluidically connects the chamber to the second passageway to restrict the flow of fuel therethrough to an upper limit.

22 Claims, 9 Drawing Sheets

TWO STAGE FUEL METERING SYSTEM FOR GAS TURBINE

FIELD OF THE INVENTION

The present invention relates generally to fuel systems and more particularly relates to fuel metering systems for aircraft engines.

BACKGROUND OF THE INVENTION

Most engines utilize a fuel supply and a fuel system for regulating the flow of fuel from the fuel supply to the combustion chamber of the engine. In a typical gas turbine engine. the fuel system comprises a fuel pump for pressurizing fuel from the fuel supply and a fuel metering system for controlling the flow of fuel to the combustion chamber. Typically the fuel metering system comprises a metering valve for modulating the fuel flow rate to the engine, while a pressurizing or shutoff valve ultimately denies or permits the delivers fuel to the combustion chamber. The system may further include a by pass valve for regulating the pressure drop across the metering valve. An important characteristic of the fuel system is the ability to accurately control the volumetric rate of fuel flow to the combustion chamber.

Some fuel metering systems control the fuel flow rate by utilizing electronic feedback to control the position of the metering valve. In one such system. a portion of the fuel from the pump flows through a flapper-type servo valve which produces a controllable output pressure which in turn controls the position of the metering valve. The metering valve responds by controlling its valve opening which directly meters fuel flow to the engine. The servo valve is operated as a function of the applied electrical current, and its output, which has a level which is precisely related to the input current, regulates the much larger flow of fuel through the metering valve. The fuel flow through the servo valve is returned to a point in the system upstream of the fuel pump for recirculation and thus is considered "parasitic leakage". An electronic position sensing device is coupled to the metering valve and determines the physical position of the metering valve. the position giving the flow rate of the fuel flowing through the metering valve. The sensing device sends an electrical signal to an electronic engine controller, which in turn generates a signal for the servo valve to regulate the throttling flow.

Systems of this type are characterized by requiring a small but potentially significant flow of fuel through the servo valve which is used only for control. The current applied to the servo valve regulates the flow through the valve which in turn regulates the output of the valve (typically in the form of a pressure) in turn directly controls the position of the metering valve. At engine start, where fuel flow to the engine is at relatively low rates. the control flow can become a significant part of the total. At all fuel flow rates, the control flow is a parasitic loss in that it is not directly involved in causing the engine to supply power. In these systems, the metering valve alone regulates the fuel flow ultimately supplied to the engine, and can therefore be termed a single-stage fuel metering system. From start to maximum engine speed, the metering valve controls the rate of fuel flow delivered to the combustion chamber, by virtue of a position sensor, electronic controller and servo valve.

While such systems have enjoyed much success, there are some drawbacks to these single-stage fuel metering systems. The range of fuel flow to be regulated by these systems ranges from about 5 pph (pounds per hour) at idle to no upper limit at maximum engine speed since the upper limit of the range depends on the particular engine used. The amount of fuel flow required for engine start ranges from about 20 pph to 250 pph, which is a relatively small range relative to the entire flow rate range which can be 5 pph to 5000 pph and higher, for example. It can therefore be seen that a single-stage metering valve that is sized to regulate a large range of fuel flows becomes less precise when regulating a smaller range of flow rates, such as during start-up.

Further, the portion of the fuel pressurized by the pump that is used to throttle the metering valve is not delivered to the engine. Rather, the control fuel flow is returned upstream for re-circulation, and causes a parasitic leakage within the fuel metering system. This is because the pump must not only pressurize the requisite fuel to be supplied to the combustion chamber of the engine, but must also pressurize the requisite fuel to control the metering valve, resulting in the need for a larger high-pressure pump. A larger pump will generate more heat which must be dissipated by the fuel system, an obvious concern in aircraft engines. A larger heat exchanger may be required to dissipate the heat. Moreover, size, weight and cost are of obvious importance in engine and fuel system design, and a larger pump increases the size and weight of the fuel system. Similarly the hardware and controls needed for an electronic feedback system increase the size, weight and cost of the fuel system.

SUMMARY OF THE INVENTION

In light of the above, a general object of the present invention is to provide a simplified, yet highly accurate, two-stage fuel metering system for an engine.

In that regard, it is also an object of the present invention to provide a fuel metering system that is highly accurate and precise at low flow rates, particularly at engine start awhile still capable of supplying accurately metered high flow rates when demanded.

It is a similar object of the present invention to provide a fuel metering system that regulates fuel in two different modes, one for low flow rates and another for high flow rates.

It is a related object of the present invention to provide a fuel metering system that does not require electronic feedback for accurate fuel flow regulation.

It is another object of the present invention to minimize the parasitic leakage in the fuel metering, system.

It is a further object of the present invention to provide a fuel metering system that is low cost, light weight and of minimum size.

In accordance with these objects, the present invention provides a novel two-stage fuel metering system for metering the flow of fuel between a fuel supply and a combustion chamber of an engine. Generally, two distinct flow paths are provided for pressurized fuel flowing to the engine. A servo valve regulates the flow through the first flow path and a metering valve regulates the flow through the second flow path, the metering valve being hydraulically controlled by the servo valve.

It is therefore a feature of the present invention that the two distinct flow paths result in two different modes of regulating the fuel supplied to the engine. At low flow rates, the servo valve regulates the flow of fuel supplied to the engine. At higher flow rates, the servo valve hydraulically controls the metering valve to regulate the flow of fuel supplied to the engine.

According to certain more specific respects, it is also a feature of the present invention to provide a first primary passageway for receiving fuel from a fuel supply and a second primary passageway for delivering fuel to an engine. The two flow paths connect the first primary passageway to the second primary passageway. The first flow path includes a servo chamber fluidically connected to both the first and second primary passageways, and the servo valve selectively regulates the flow of fuel entering the chamber from the first passageway. The metering valve forms the second flow path and fluidically connects the first and second passageways to regulate the flow of fuel from the first passageway to the second passageway. The metering valve is biased to a closed position that obstructs the fuel flow, and is disposed in the servo chamber such that it responsive to the pressure in the chamber. The metering valve is adapted to move from the closed position toward an open position in response to sufficient fuel pressure in the chamber. The first and second flow paths are thus coupled in parallel between the first and second passageways to form the novel two-stage fuel metering system.

The flow rate of fuel through the first flow path (regulated by the servo valve) is limited to a predetermined level. At fuel flow rates below the predetermined level, i.e. low flow rates, pressurized fuel follows the first flows path and travels from the first passageway through the servo valve and chamber into the second passageway for delivery to the engine. As the servo valve allows fuel to enter the chamber at a rate higher than can pass through the first flow path, the pressure in the chamber builds. When the pressure reaches an adequate level, the actuating surface of the metering valve responds to the pressure and the metering valve moves toward an open position, allowing fuel to begin flowing directly from the first passageway to the second passageway, through the metering valve. The fuel metering system is therefore two-staged, one flow of fuel flows through the servo valve to the second passageway, at a rate determined by the servo valve, while a second flows of fuel flows through the metering valve to the second passageway at a rate determined by the position of the metering valve. As the servo valve increases the rate of fuel flowing into the chamber, the pressure in the chamber increases and the metering valve opens further, to pass more fuel through to the second passageway and hence the combustion chamber of the engine. Therefore, the current applied to the servo valve determines both the flow through the first flow path, as well as the flow through the second flow path.

It is another feature of the present invention to provide mechanical feedback between the metering valve and the servo valve. The servo valve regulates the flow of fuel therethrough as a function of electrical current applied to the servo valve. The mechanical feedback reduces the increase in fuel flow into the chamber that results from increasing the current applied to the servo valve once the metering valve has been opened. The mechanical feedback therefore increases the precision of control over positioning the metering valve, and hence the fuel flow rate to the combustion chamber.

These and other object and advantages of the invention will become more apparent from the following detailed description when taken in con junction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENT

Figure 1:
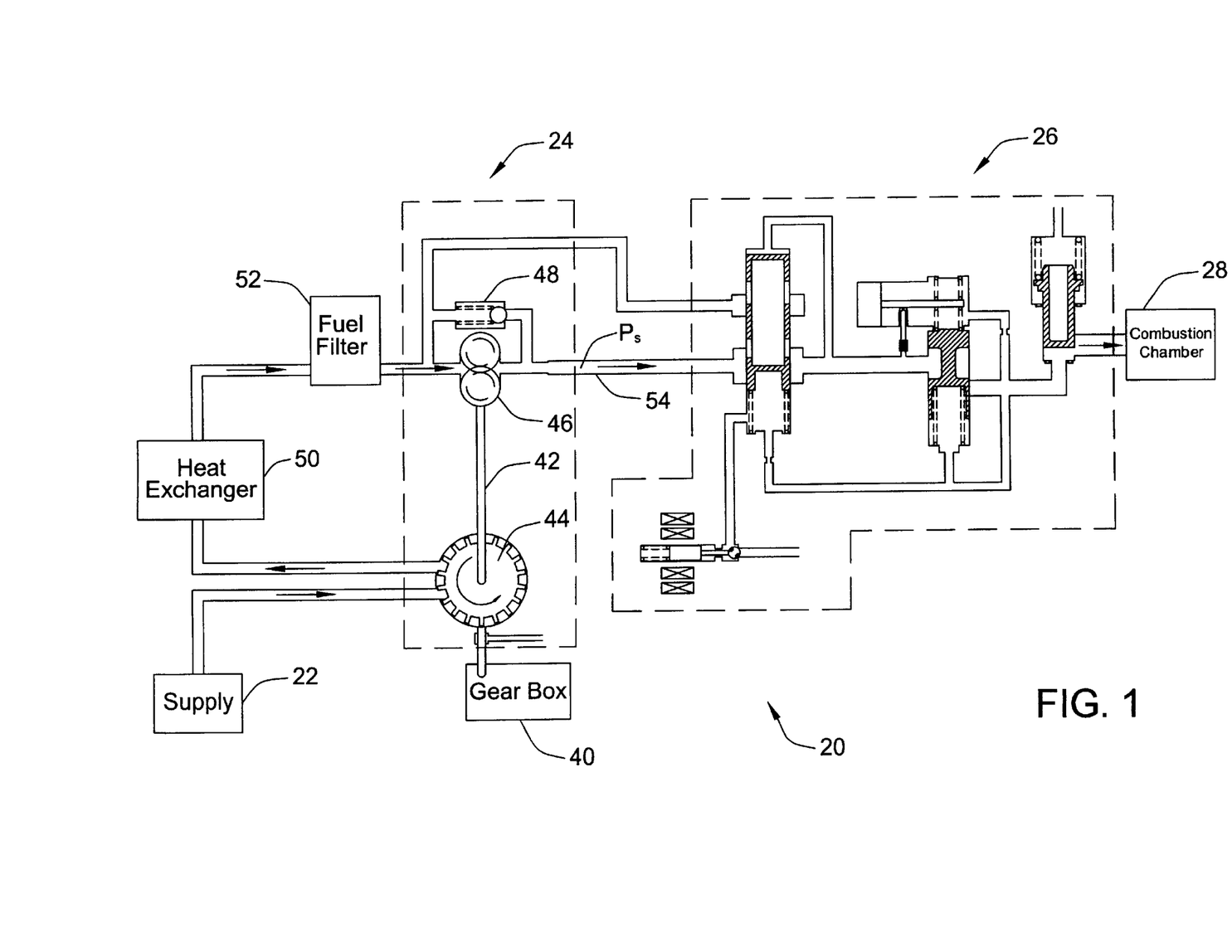
FIG. 1 is a schematic illustration of a fuel system incorporating a preferred embodiment of a fuel metering system according to the present invention.

Referring now to the drawings. FIG. 1 shows a schematic illustration of a fuel system, including an embodiment of the fuel metering system of the present invention. The fuel system 20 generally comprises fuel supply 22, a fuel pump system 24 and a fuel metering system 26 to deliver fuel to the combustion chamber 28 of an engine. The terms "fuel supply" and "pressurized fuel supply" are sometimes used interchangeably herein in the generic sense to encompass both the fuel supply 22 and the pumping system 24 which pressurizes it. The fuel pump system 24 includes a gear box 40 coupled to shalt 42 which is mechanically connected to both the boost pump 44 and the high pressure pump 46. Boost pump 44 pressurizes the fuel from the fuel supply 22. The fuel flows as shown by the arrows in FIG. 1, wherein the fuel exits boost pump 44 and flows through heat exchanger 50. From the heat exchanger 50, fuel flows through fuel filter 52 to rid the fuel of unwanted contaminants. Subsequent to filter 52, fuel enters high pressure pump 46 where it is highly pressurized to a supply pressure, denoted $P_s$ in FIG. 1. A high pressure relief valve 48 is coupled across the high pressure pump 46, and opens to release pressure in the event that the pressure $P_s$ of the fuel downstream of the pump 46 rises above acceptable levels. The fuel exiting the high pressure pump 46 then enters the fuel metering system 26. which regulates the fuel flow to the combustion chamber 28.

By way of the inventive features of the present invention, it will be readily understood by one of ordinary skill in the art that through the use of the two-stage fuel metering system, fuel supplied to the combustion chamber is metered in a highly accurate manner that does not require electronic feedback and minimizes the parasitic leakage in the fuel metering system. The fuel metering system is highly accurate, especially at low flow rates such as engine start, and is light weight, low cost and of minimum size. While electronic feedback is not necessary, it may be employed in conjunction with the present invention if so desired.

Figure 2:
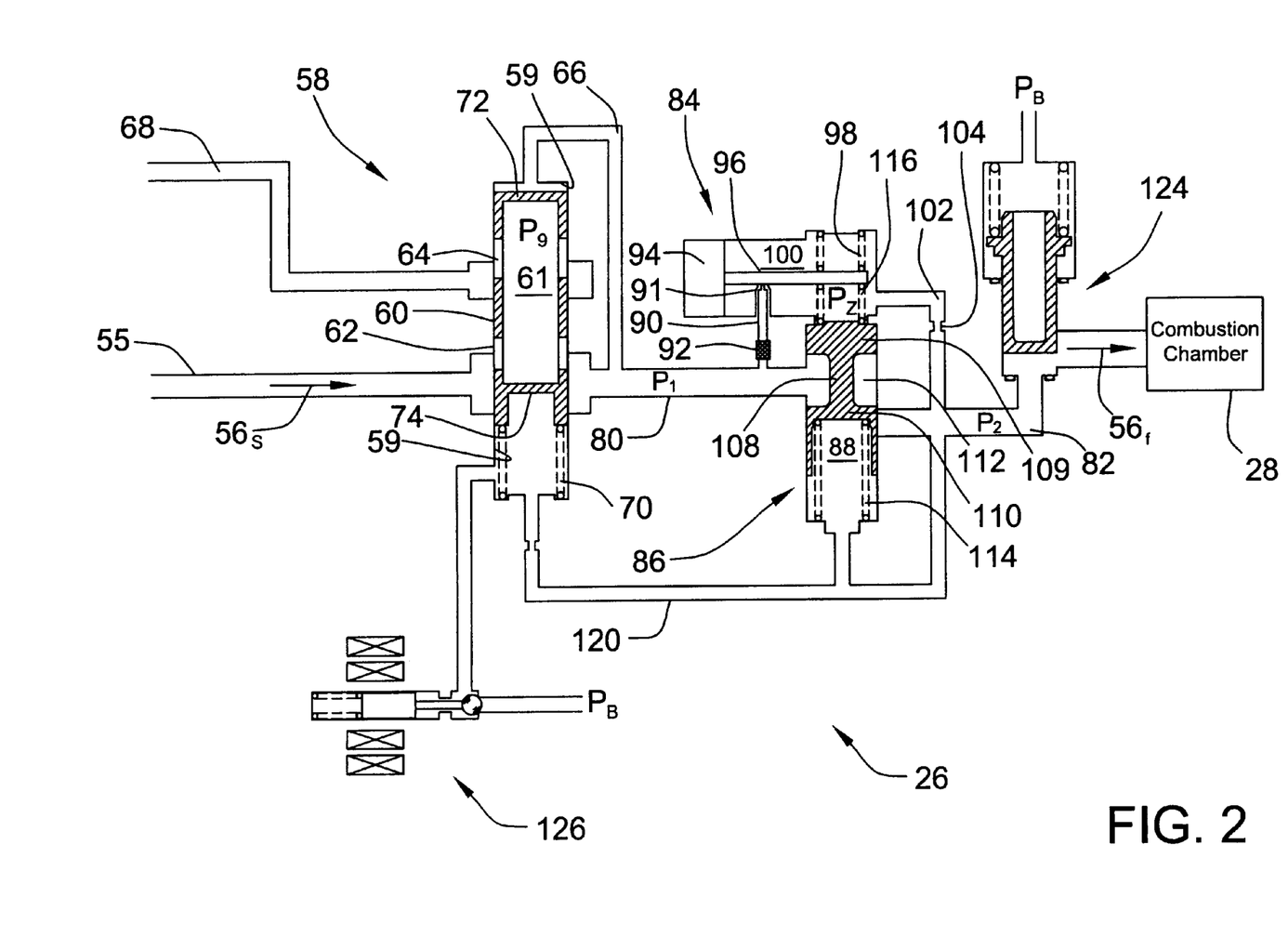
FIG. 2 is a schematic illustration of the fuel metering system of FIG. 1.

Turning to FIG. 2, a schematic illustration of a preferred embodiment of the fuel metering system 26 of FIG. 1 is shown. The fuel, represented by arrow $56_S$, enters the fuel metering system 26 at inlet 55 and flows through the bypass valve 58 into the first primary passageway 80. It will be understood by those having skill in the art that the bypass valve 58 as described herein is for purposes of illustrating a preferred embodiment of the present invention, but is not necessary in order to practice the present invention. Further, while a standard bypass valve has been illustrated, a dedrooped bypass valve such as that disclosed in U.S. Pat. No. 5.433.237, commonly owned by assignee of the present invention, which is hereby expressly incorporated by reference, is preferably employed in conjunction with the present invention. The bypass valve 58 includes a piston 60 slidably disposed within a bypass chamber 59. The piston 60 itself further includes an interior chamber 61. The pressure within the interior chamber 61 of the bypass valve 58 is denoted $P_9$ in FIG. 2. The bypass valve includes a first annular aperture 62 fluidically connecting the inlet 55 and the first primary passageway 80. The piston 60 is biased upwardly, and in the preferred embodiment is biased by spring 70. The piston 60 further includes a second annular aperture 64 fluidically connecting the interior chamber 61 to bypass return conduit 68. A bypass conduit 66 fluidically connects the first primary passageway 80 and the bypass chamber 59 at an end of the bypass chamber 59 adjacent the piston's first end 72.

It can be seen in FIG. 2 that the first primary passageway 80 is fluidically connected to the second primary passageway 82, and the metering valve 86 is disposed between the first and second primary passageways 80, 82. Fuel flowing through the second primary passageway 82 is at a pressure $P_2$, which is ultimately delivered to the combustion chamber 28, as denoted by arrow $56_f$. Pressure conduit 120 fluidically connects the second primary passageway 82 to the bypass chamber 59 at a position adjacent the second end 74 of bypass piston 60. The fuel in conduit 120 is at a pressure $P_2$, corresponding with the pressure in the second primary passageway 82. Since the bypass piston 60 is slidably disposed within the bypass chamber 59, the pressure differential between the first end 72 and the second end 74 is given by the difference in pressure $P_1$ and pressure $P_2$, as supplied by bypass conduit 66 and pressure conduit 120 respectively. The pressure $P_9$ within the interior chamber 61 does not effect the pressure differential $P_1-P_2$. As the bypass piston 60 moves axially, the first annular aperture 62 and second annular aperture 64 are disposed relative to the bypass return conduit 68 and the first primary passageway 80 in varying states of open. Should the pressure drop across the fuel metering valve 86, i.e. pressure $P_1$ relative to pressure $P_2$, reach an unacceptable level (i.e. too high or too low), the bypass valve 58 will slide axially further open or closed to regulate fuel escaping through bypass return conduit 68 to be returned upstream of the high pressure pump 46 for re-circulation (see FIG. 1).

Referring again to FIG. 2. the fuel metering system 26 includes servo chamber 100 fluidically connected to the first primary passageway 80. In the preferred embodiment, nozzle 90 connects the chamber 100 and passageway 80 by diverting a portion of the fuel flowing through the first primary passageway 80 to an inlet of the chamber 100. The fuel exits the outlet 91 of the nozzle 90 and enters the chamber 100. A servo valve 84 is disposed between the first primary, passageway 80 and an outlet of the servo chamber 100 to regulate the flow of fuel entering the chamber 100 via nozzle 90. In the preferred embodiment shown, the servo valve 84 includes a servo actuator 94 disposed within the servo chamber 100 which actuates a flapper arm 96. The servo 94 positions the flapper arm 96 relative to the outlet 91 of the nozzle 90 to regulate the flow of fuel exiting outlet 91.

The servo 94 positions the flapper arm 96 as a function of the electrical current applied to the servo 94. The relative positions of flapper 96 and nozzle outlet 91 are very tightly toleranced to provide highly accurate control over the flow rate of the exiting fuel. To facilitate this accurate flow regulation, an additional fuel filter 92 may be employed at a point between the first primary passageway 80 and the outlet 91 of nozzle 90. The flapper arm 96 is biased to a closed position by spring 98, wherein the flapper 96 substantially blocks the outlet 91 of nozzle 90.

A metering valve 86 is disposed between the first primary passageway 80 and the second primary passageway 82 to regulate the flow of fuel therebetween. The metering valve 86 generally comprises a piston 108 slidably disposed within a metering chamber 88. As with the bypass valve 58, the pressure conduit 120 fluidically connects the second primary passageway 82 to an end of the metering chamber 88 opposite the servo chamber 100. The piston 108 includes an annular channel 112 for fluidically connecting passageways 80 and 82. As the piston 108 slides axially, the annular channel 112 moves relative to the first passageway 80 and second passageway 82 to fluidically connect the passageways and regulate the flow to the second passageway 82. The piston 108 is biased upwardly to a closed position by spring 114, and obstructs the fuel flow in the closed position, as shown in FIG. 2. The piston 108 slides axially against the biasing force of spring 114 to varying states of open to regulate the fuel flow therethrough.

As shown in FIG. 2, the preferred embodiment of the fuel metering system 26 further includes a pressurizing and shutoff valve 124. The pressurizing and shutoff valve is connected to the second primary passageway 82 and is controlled by a separate shutoff solenoid valve 126. It will be understood by those skilled in the art that the pressurizing and shutoff valve 124 provides a minimum pressure function during operation, and zero leakage during shutoff.

In accordance with an aspect of the present invention an axial end of the metering valve 86 is in communication with the servo chamber 100. In particular, the first end 109 of the metering piston 108 contacts the fuel present in the servo chamber 100. The piston 108 is responsive to the fuel pressure in the servo chamber 100, denoted $P_z$ in FIG. 2. Sufficient pressure $P_z$ in the chamber 100 causes the piston 108 to slide axially against the biasing force (including the pressure $P_2$ of fuel at the second end 110 supplied by pressurizing conduit 120) and relative to the first and second passageways 80, 82 in varying states of open.

In accordance with another aspect of the present invention the chamber 100 is fluidically connected to the second primary passageway 82 via conduit 102. In the preferred embodiment, conduit 102 includes a restriction orifice 104 that sets an upper limit on the rate of fuel flowing therethrough. The significance of the metering valve 86 being in communication with the servo chamber 100, and the conduit 102 fluidically connecting the servo chamber 100 and second primary passage 82 will be discussed below in conjunction with an operational description of the fuel metering system.

Figure 3:
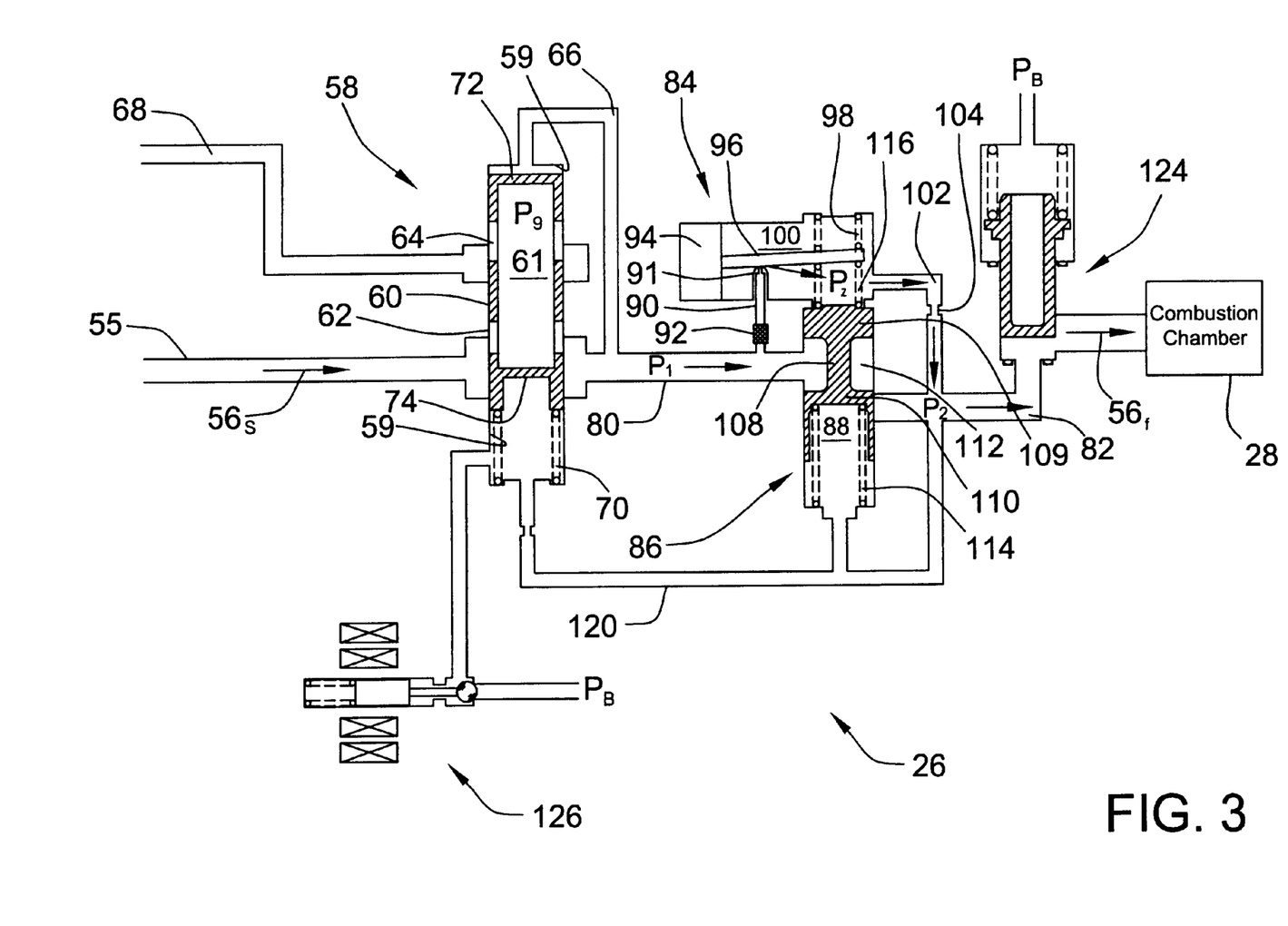
FIG. 3. is a schematic illustration of the fuel metering system of FIG. 1 indicating a flow of fuel therethrough.

FIG. 3 shows the start flow of pumped fuel through the fuel metering system 26, as indicated by the plurality of arrows in the figure. It can be seen that fuel in the first primary passageway 80 is pressurized at $P_1$. An electrical current is applied to the servo 94. moving the flapper arm 96 away from the outlet 91 of nozzle 90. Since the metering valve is biased to its closed position, fuel flows through nozzle 90 and into the servo chamber 100, where the fuel has a pressure $P_z$. Fuel then exits the chamber 100 via conduit 102, flowing through the restriction orifice 104 to the second primary passageway 82. where it is then delivered to the engine at a pressure $P_2$. During start-up. i.e. low flow rates., the pressure $P_z$ is insufficient to move the piston 1(08 of the fuel metering valve 86.

As more current is applied and the servo valve 84 opens further, more fuel flows through conduit 102, at rates approaching the upper limit conditioned by restriction orifice 104. It will be understood by those having skill in the art that the upper limit for the flow rate of fuel exiting the servo chamber 100 may be set by appropriately sizing the servo chamber's outlet or the conduit 102 itself, or by utilizing other conventional restriction means. The upper limit is preselected with regard to the fuel flow needed for engine start. Generally, the flow rate through conduit 102 is limited to rates slightly larger than required for engine start, so that all of the pumped fuel flows through conduit 102 to the second passageway 82 during start-up. This allows the servo valve 84 alone to regulate the fuel flow rate ultimately delivered to the combustion chamber 28 during start-up. Therefore, the flow rate throughout start-up is regulated with a high degree of accuracy due to the superior control provided by servo valve 84.

As the flow rate through conduit 102 approaches the upper limit, the pressure $P_z$ in the servo chamber 100 increases. As $P_z$ increases, the force placed on the first end 109 of the metering piston 108 increases accordingly. As $P_z$ reaches sufficient levels i.e. generates a force stronger than the opposing biasing force placed on the piston 108 by spring 114 and the fuel pressure $P_2$ (supplied by pressurizing conduit 120), the piston 108 begins to move downwardly and the metering valve 86 begins to open. Thus a certain level of electrical current applied to the servo valve 84 corresponds with a specific rate of fuel flow through the servo valve 84 and a sufficient pressure $P_z$ to position the metering valve 86.

Figure 4:
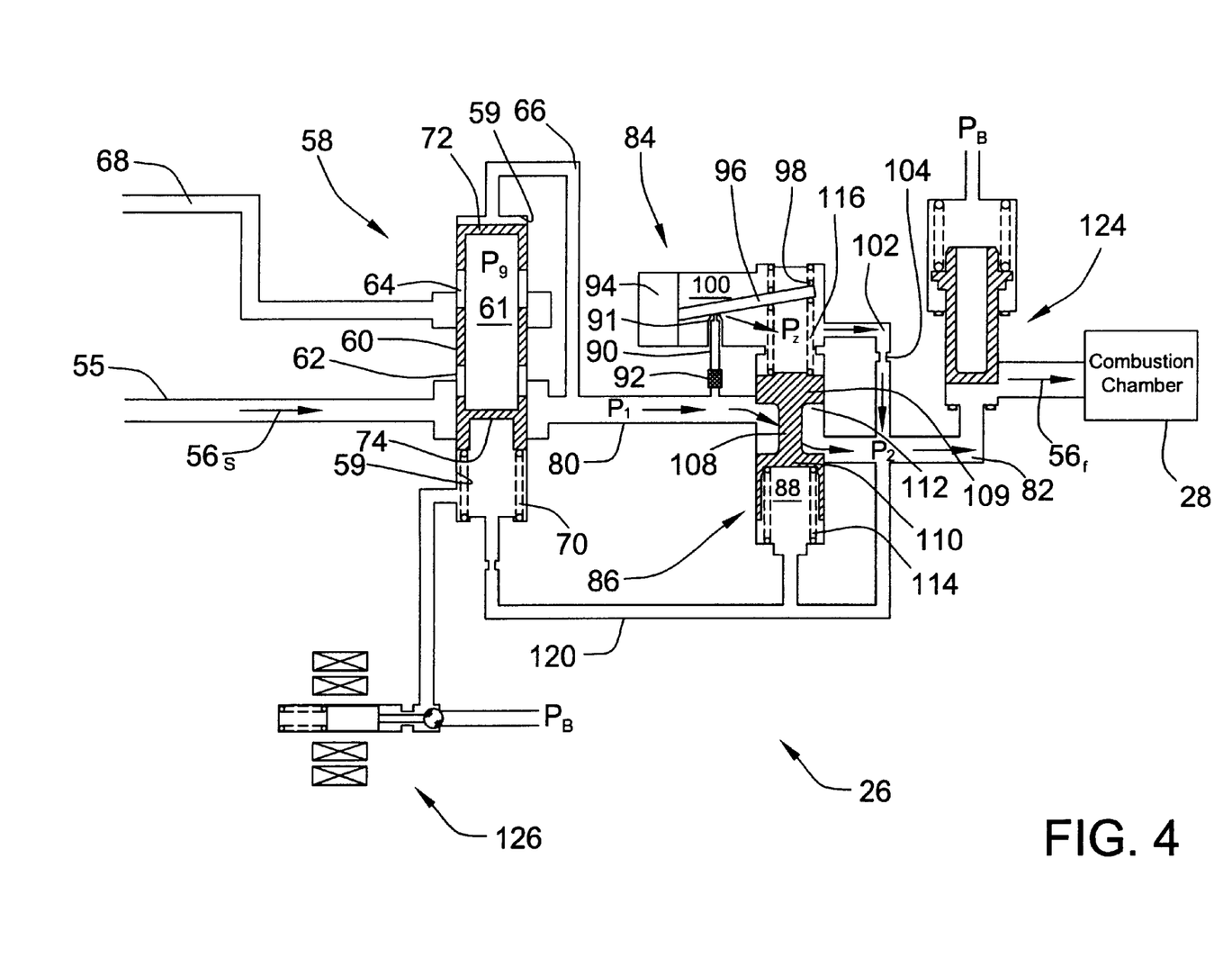
FIG. 4. is a schematic illustration of the fuel metering system of FIG. 1 indicating a flow of fuel therethrough.

Referring now to FIG. 4, upon the opening of metering valve 86 in response to sufficient pressure $P_z$ in the servo chamber 100. fuel flows from first passageway 80, through annular channel 112 of the metering piston 108 to the second passageway 82. as shown by the plurality of arrows. Thus, once the pressure $P_z$ in the servo chamber 100 reaches a sufficient level to throttle the metering valve 86, fuel continues to flow through the servo valve 84 and conduit 102 to the second passageway 82, yet also flows through the metering valve 86 to the second passageway 82, i.e. the fuel metering system 26 is two-staged. As the servo valve 84 continues to allow more fuel to flow 20 therethrough, the pressure $P_z$ in the servo chamber 100 increases and the metering valve 109 is positioned further open in response to increased $P_z$, thereby allowing more fuel to pass through the metering valve 86 to the second passageway 82 for delivery to the combustion chamber 28. Thus the servo valve 84, chamber 100 and conduit 102 provide a first flow path while the metering valve 86 provides a second flow path, both paths connecting the first and second passageways 80, 82. As such, the first and second flow paths are connected in parallel to form a two-stage fuel metering system.

In accordance with another aspect of the present invention, a mechanical feedback is employed to link the servo valve 84 and metering valve 86. In the preferred embodiment, a feedback spring 116 is used to link the valves 84 and 86. More specifically, the spring 116 attaches to the flapper arm 96 of the servo valve 84, and also engages the first end 109 of the piston 108 of the metering valve 86. As more current is applied to the servo valve 84, the flapper arm 96 opens further, allowing more fuel to pass therethrough. Since the flow rate through the conduit 102 is limited, the pressure $P_z$ increases and the metering valve 86 opens further in response to the pressure increase. As the piston 108 of the metering valve 86 moves away from the servo chamber 100 in response to the pressure $P_z$, the feedback spring 116 pulls the flapper arm 96 slightly back towards the closed position. The flapper arm 96 returns to a position slightly more open than the position prior to the increase in current to the servo valve 84. Thus the feedback spring 116 reduces the effect on the flapper arm 96 from increasing the current applied to the servo valve 84, thereby improving the control over the flapper arm 96 and hence the pressure $P_z$ in the servo chamber 100. At the same time, the metering valve 86 is precisely positioned at increasing states of open.

It can therefore be seen that accurate control of the fuel flow rate is attained throughout the range of fuel flow. During start-up the servo valve 84 directly controls the rate of fuel flow ultimately supplied to the combustion chamber 28. When the flow through the servo valve 84 and conduit 102 reaches the predetermined limit, the flow into the servo valve 84 creates a pressure $P_z$ that acts to position the second stage metering valve 86 in various states of an open position. Therefore the flow rate of fuel delivered to the combustion chamber 28 throughout the entire range of fuel flow rates is controlled simply as a function of the electrical current supplied to the servo valve 84, and the fuel metering system regulates the fuel flow in a highly accurate manner.

Figure 5:
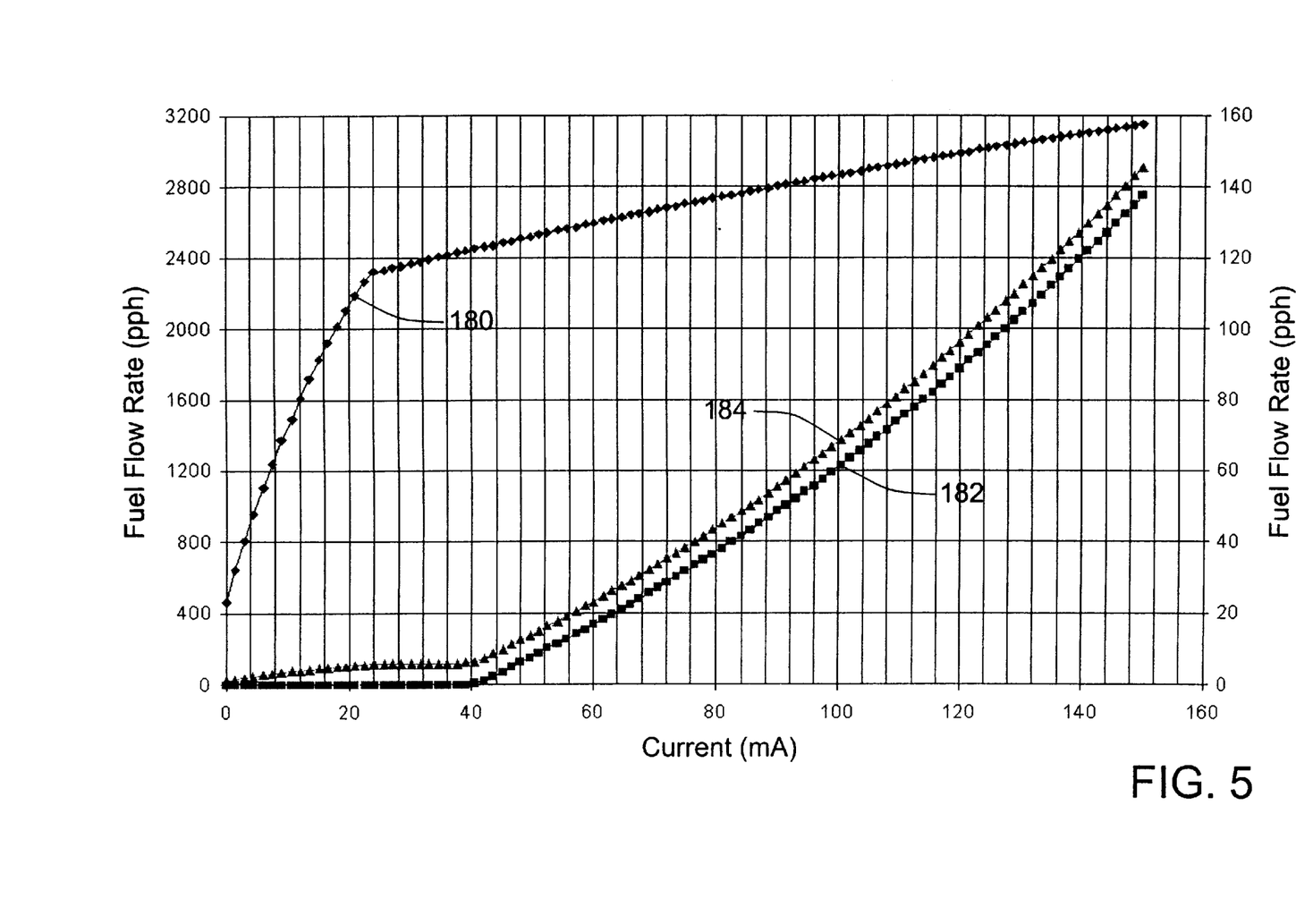
FIG. 5 is a chart showing fuel flow rate through an embodiment of the fuel metering system in relation to the current applied to the servo valve.

To better illustrate this point, FIG. 5 shows a chart representing data taken for a fuel metering system constructed according to the present invention as described above. The vertical axis corresponds to the fuel flow rate measured in pounds per hour (pph), the left axis having a scale of 0 to 3200 pph and the right axis having a scale of 0 to 160 pph. The horizontal axis corresponds to the electrical current applied to the servo valve measured in milli-amperes (mA). Line 180 represents data taken for the flow rate through the nozzle (and hence the servo valve) and the corresponding flow rate data is read using the scale on the right side of the graph. Line 182 represents data taken for the flow rate through the metering valve, and line 184 represents data taken for the total flow rate the fuel metering system, both read using the scale on the left side of the graph. It can be seen that as the electrical current is initially applied to the servo valve, and as it increases from 0 to 24 mA, the fuel flow rate through the metering valve remains zero (line 182) while the flow through the nozzle (nozzle 180) increases steadily from about 20 pph to about 120 pph. Therefore the total flow, represented by line 184, is identical to the flow through the nozzle at this juncture.

At approximately 24 mA, the slope of line 180 changes as the rate of flow through the nozzle increases more slowly. At this point, the pressure in the servo chamber has reached a sufficient level for moving the metering valve. However, there is a certain distance the metering valve must move before the valve opens to allow fuel to flow therethrough. Thus from about 24 to 40 mA, the metering valve moves towards an open position, while the pressure in the servo chamber increases, as does the flow rate through the nozzle. Although the flow rate through the nozzle continues to increase, the feedback spring reduces the rate of increase of fuel flow as indicated by the decreased slope of line 180. At approximately 40 mA, the metering valve begins to open and fuel begins to flow therethrough. As the electrical current applied to the servo valve increases, the flow through the metering valve and the nozzle also increases, although the flow through the nozzle increases on a smaller level due to the mechanical feedback between the metering valve and servo valve.

Thus, at flow rates above approximately 120 pph, the flow of fuel delivered to the combustion chamber is primarily regulated by the metering valve, up to flow rates approaching 3000 pph. Since fuel continuously flows through the servo valve and conduit, and through the metering valve, both for delivery to the combustion chamber, the fuel metering system of the present invention is two-staged. This can be seen in FIG. 5 wherein the total fuel flow (line 184) remains slightly larger than the flow solely through the metering valve (line 182), the difference representing the now through conduit from the servo chamber. It will be understood by those skilled in the art that the specific numerical values described above and shown in the chart of FIG. 5 merely represent one embodiment of the fuel metering system according to the present invention, and that the present invention may be practiced with other flow ranges and limits that vary from those shown above, for individualized applications and various engine sizes.

Looking at the total fuel flow, represented by line 184 in FIG. 5, it can be seen that during start-up (i.e. 0–120 pph) the slope of line 184 is somewhat less than the slope during normal operation (i.e. 120–3000 pph). Since the slope represents the increase in flow rate per unit increase in current, or control slope, a lower control slope indicates more precision in the control over the flow rate. That is because a lower slope means that the flow rate increases less per unit increase in current. It can therefore be seen that the total flow rate of fuel delivered to the engine, especially at start, is controlled in a highly precise and accurate manner as a function of current applied to the servo valve, the control slope at low flow rates (i.e. start-up) is lower than at higher flow rates, indicating a higher degree of precision over the lower flow rates.

Figure 6:
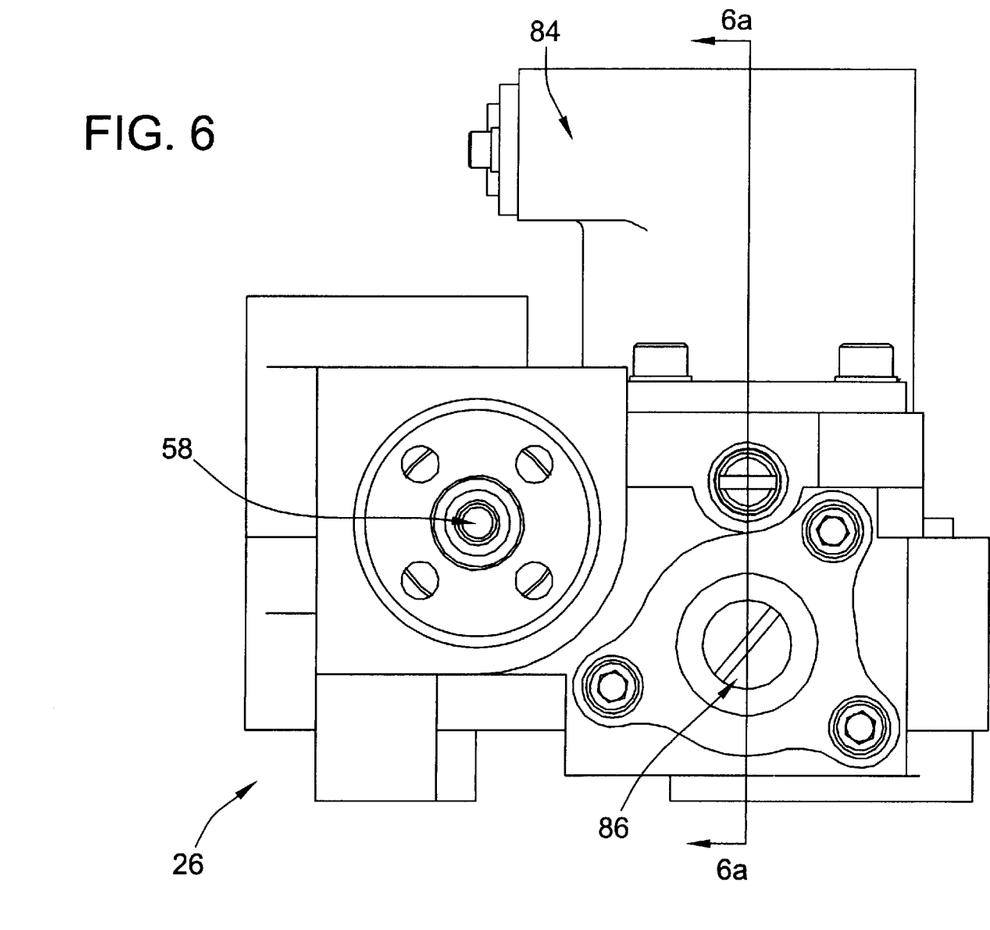
FIG. 6 is an end view of a preferred embodiment of a fuel metering system constructed according to the present invention.
Figure 6A:
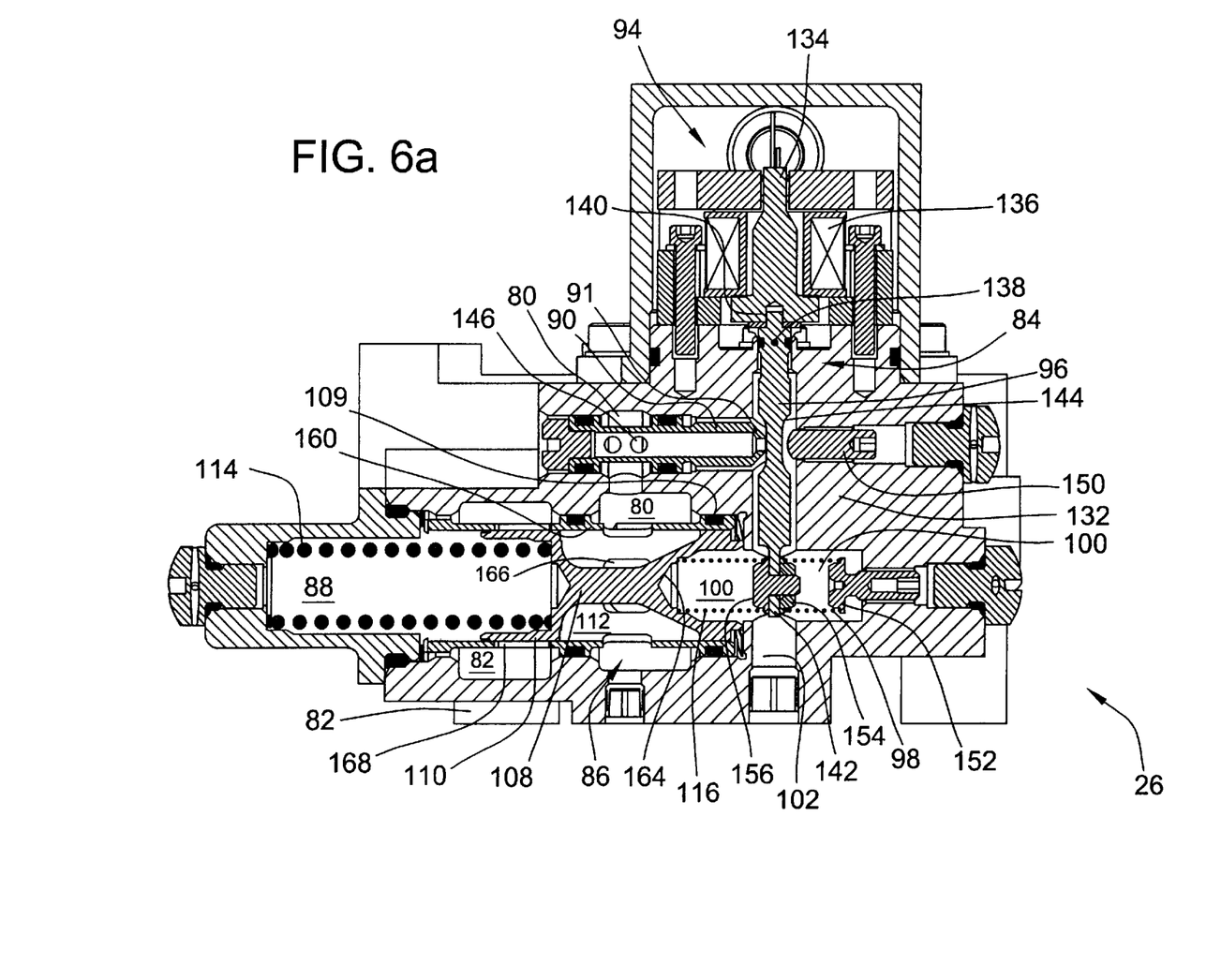
FIG. 6A is a cross-sectional view of the fuel metering system of FIG. 6.

Turning now to FIGS. 6 and 6A. a preferred embodiment of the fuel metering system constructed according to the present invention is illustrated. FIG. 6 shows an end view of a fuel metering system 26, including a bypass valve 58, a servo valve 84 and a metering valve 86. Line A—A represents a cut through the fuel metering system 26 for purposes of the cross-sectional view shown in FIG. 6A.

Referring to FIG. 6A, a cross-sectional view of the embodiment of the fuel metering system 26 is shown. For clarity, elements corresponding to the elements described in the schematic illustrations of FIGS. 2–4 will be referred to with common numerical references. The fuel metering system 26 generally comprises a manifold 132 which defines the first and second primary passageways 80, 82, the servo chamber 100, and the metering chamber 88. The first primary passageway 80 delivers fuel to the nozzle 90 of the servo valve 84, as well as to the metering valve 86. The nozzle 90 includes apertures 146 for diverting fuel into the nozzle 90. Fuel exits the nozzle 90 at its outlet 91, and is regulated by the servo valve 84. The servo valve 84 includes servo 94, which comprises induction coils 136 and armature 134. Flapper arm 96 includes a first end 140 attached to the armature 134 for positioning the flapper 96. The flapper arm 96 is pivotally mounted to the manifold 132 at point 138. The flapper arm 96 further includes a reduced diameter portion 144 disposed adjacent the nozzle outlet 91 which selectively engages the outlet 91. As previously described, a current is applied across the coils 136 which selectively positions the armature 134, and hence the flapper arm 96. The flapper arm 96 pivots to regulate the flow of fuel exiting the outlet 91 of nozzle 90. A stop 150 is disposed within the manifold 132 and may be selectively adjusted to limit the pivotal motion of the flapper arm 96. Fuel exits nozzle outlet 91 and flows through the servo chamber 100 to conduit 102 for delivery to the second primary passageway 82.

At the second end 142 of flapper arm 96, a seat 154 is attached for receiving spring 98. A seat 152 is mounted to the manifold 132 and receives the opposing end of spring 98. Spring 98 biases the servo valve 84 towards the closed position, and seat 152 may be selectively adjusted to calibrate the resistance placed on flapper arm 96 by spring 98 for start flow. Similarly, seat 156 is attached to the second end 142 of flapper arm 96 and receives mechanical feedback spring 116. The first end 109 of piston 108 includes actuation surface 164, the surface adapted to receive the opposing end of feedback spring 116. Spring 116 therefore mechanically links the flapper arm 96 of the servo valve 84 and the piston 108 of the metering valve 86.

The metering valve 86 includes a sleeve 160 disposed within the metering chamber 88 of the manifold 132. The metering piston 108 is slidably mounted within the sleeve 160, and is biased to a closed position by spring 114. The second end 110 of piston 108 seats one end of the spring 114. While the manifold 132 generally seats the opposing end of spring 114. The spring 114 may be selectively adjusted to calibrate the main fuel flow, i.e. once the metering valve 86 has opened. The sleeve 160 includes inlet apertures 166 for receiving fuel from the first primary passageway 80, and outlet apertures 168 for delivering fuel to the second primary passageway 82. The inlet and outlet apertures 166, 168, in conjunction with the annular channel 112 of the piston 108, fluidically connect the first passageway 80 to the second passageway 82.

Figure 7:
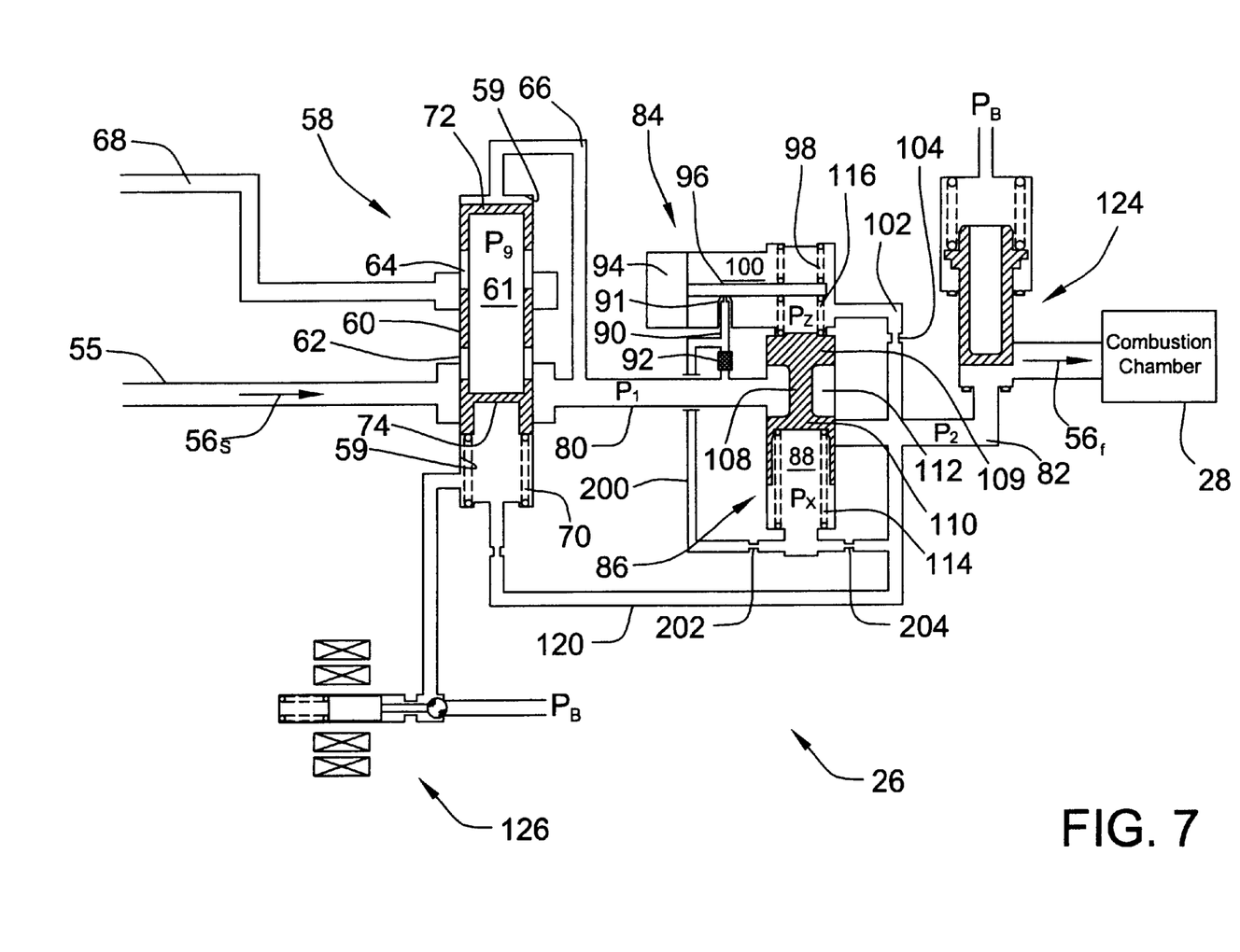
FIG. 7 is a schematic illustration of an embodiment of a fuel metering system according to the present invention.

FIG. 7 schematically illustrates an alternate embodiment of the fuel metering system 26. Larger engines often require larger fuel flow rates during start-up. The embodiment depicted in FIG. 7 addresses this requirement by providing a supplemental conduit 200 which supplies an additional amount of fuel to the combustion chamber 28. Fuel flow from the first primary passageway 80 is diverted through conduit 200 at some point upstream of the metering valve 86 and servo valve 84, preferably being diverted from the nozzle 90. This diverted fuel flows through restriction 202 and into the metering chamber 88 at an end of the chamber adjacent the second end 110 of the metering piston 108. The pressure in this portion of the metering chamber 88 is denoted $P_x$, which is less than $P_1$ and greater than $P_2$. The supplemental conduit 200 includes another restriction 204 located downstream of the meter chamber 88, which is fluidically connected to the second primary passageway 82 for delivery to the combustion chamber 28, preferably connected via pressurizing conduit 120.

The restrictions 202, 204 act to limit the flow rate of fuel diverted from the nozzle 90 by supplemental conduit 200. By doing so, an additional amount of fuel may be constantly supplied to the combustion chamber at a selected fuel flow rate, which can be especially important during start-up (i.e. lower flow rates). As stated above, a larger flow of fuel may be necessary during start-up. However, an engine may utilize flow rates approaching 220 pph during start-up. To meet this requirement, supplemental conduit 200 and restrictions 202, 204 may be sized and provided to supply an additional fuel flow of about 100 pph so that the servo valve 84 may regulate the total flow of fuel from approximately 100 pph to 220 pph. This obviates the need to provide a differently sized servo valve 84 yet allows the servo valve 84 to control the delivery of fuel to the combustion chamber with the same high degree of accuracy. Again, these specific numbers are a given by way of example, and may be selected for a given application.

Figure 8:
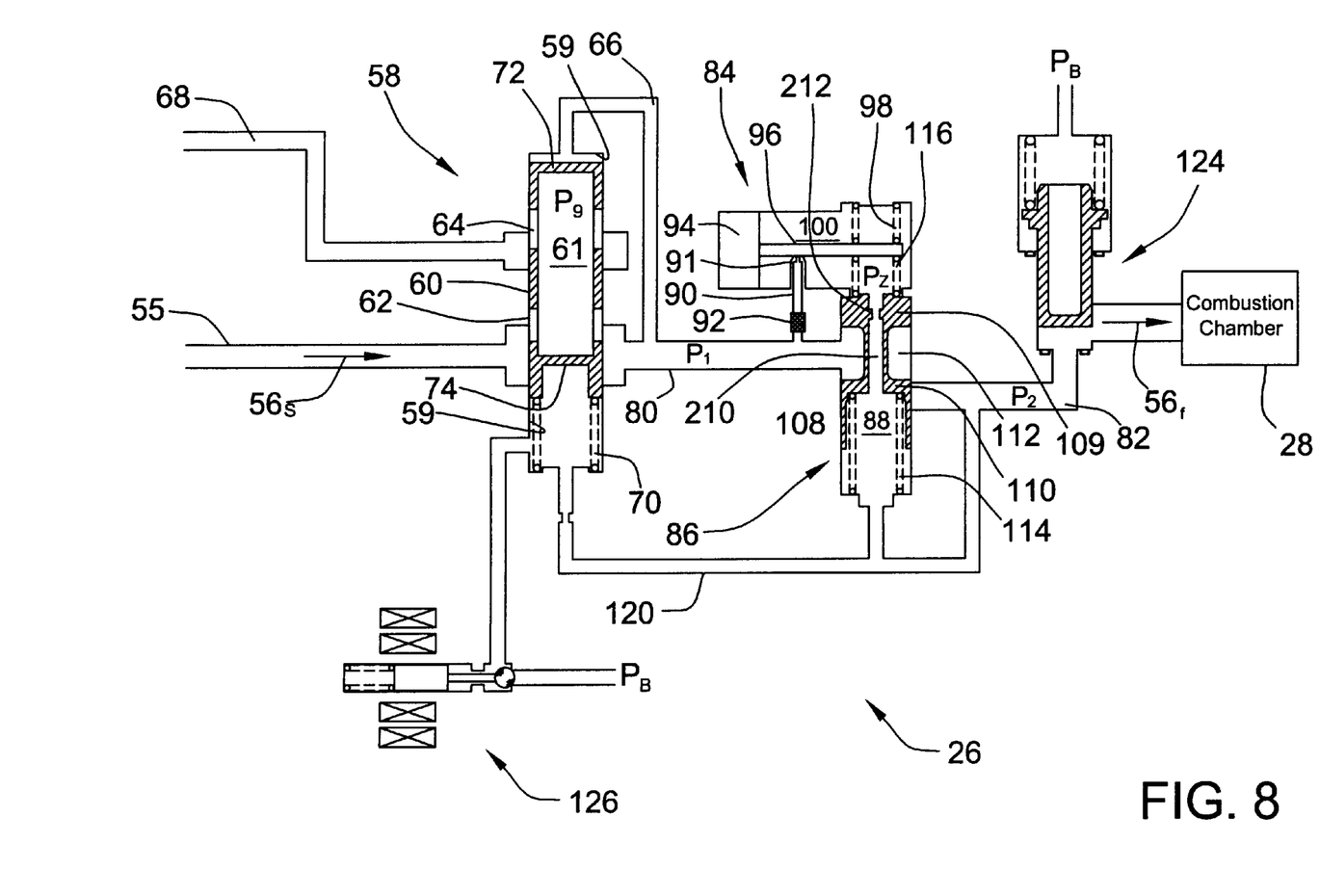
FIG. 8 is another schematic illustration of an embodiment of a fuel metering system according to the present invention.

Turning to FIG. 8, another alternate embodiment of the present invention is schematically illustrated. In this embodiment, the fluidic connection between the servo valve 84 and second primary passageway 82 is provided integrally with the metering valve 86. Essentially, conduit 102 and restriction 104 have been relocated, shown as conduit 210 and restriction 212 in FIG. 8. both integrally provided in the metering piston 108 of the metering valve 86. Conduit 210 fluidically connects the servo chamber 100 to the portion of the metering chamber 88 adjacent the metering piston's second end 110. It will be understood that fuel in the servo chamber 100 pressuring the first end 108 of the metering piston 108 escapes through conduit 210, is restricted by restriction orifice 212, and flows to the second primary passageway 82 for delivery to combustion chamber 28, connected via a portion of pressurizing conduit 120.

Based on the foregoing, it can readily be seen that the two-stage fuel metering system of the present invention supplies fuel to a combustion chamber in a highly accurate manner that does not require electronic feedback. The fuel is regulated over the entire range of flow rates by a single factor, the current applied to the servo valve, which is inherently accurate. The fuel metering system is especially accurate at low flow rates such as engine start by virtue of the two-stage system. Furthermore, by allowing the fuel that throttles the fuel metering valve to be delivered to the combustion chamber of the engine, the parasitic leakage is minimized in the fuel metering system. As the parasitic leakage is minimized, smaller pumps are required to adequately pressurize to fuel from the fuel supply for burning in the combustion chamber. Thus the fuel metering system is highly accurate light weight, low cost and of minimum size.

What is claimed is:

1. A fuel metering system for regulating the flow of fuel between a fuel supply and an engine, the fuel metering system comprising:
    a first flow path in fluid communication with the fuel supply and the engine;
    a second flow path in fluid communication with the fuel supply and the engine,
    an electrically controlled servo valve regulating the fuel flow entering the first path; and
    a metering valve regulating the fuel flow through the second path, the metering valve connected to be hydraulically controlled by the servo valve.

2. The fuel metering system of claim 1, wherein the servo valve is a flapper valve.

3. The fuel metering system of claim 1, wherein the second flow path is coupled across the first flow path in parallel.

4. The fuel metering system of claim 1, wherein fuel supplied to the engine at low flow rates is regulated by the servo valve and wherein fuel supplied to the engine at higher flow rates is regulated by the metering valve.

5. The fuel metering system of claim 1, wherein fuel supplied to the engine at low flow rates flows through the first flow path, and wherein fuel supplied to the engine at higher flow rates flows through both the first and second flow paths.

6. The fuel metering system of claim 1, wherein the metering valve is biased to a closed position and is in fluid communication with the first flow path and responsive to fuel pressure therein, and wherein the flow rate of fuel exiting the first flow path is restricted to an upper limit, the pressure in the first flow path becoming sufficient to move the metering valve from the closed position towards an open position when fuel enters the first flow path through the servo valve at flow rates higher than the upper limit.

7. The fuel metering system of claim 6, wherein the fuel delivered to the engine at flow rates below the upper limit flows solely through the first flow path, and wherein the fuel delivered to the engine at flow rates above the upper limit flows through both the first and second flow paths.

8. The fuel metering system of claim 6, wherein the upper limit of fuel flow exiting the first flow path is equal to or greater than the flow rate required for engine start-up.

9. The fuel metering system of claim 6, wherein the metering valve is mechanically linked to the servo valve to reduce the increase in fuel flow through the servo valve when the metering valve moves to increasingly open positions.

10. A fuel metering system for regulating the flow of fuel between a pressurized fuel supply and an engine, the fuel metering system comprising in combination:
    an electrically controlled servo valve,
    a metering valve connected to be hydraulically controlled by the servo valve;
    the servo valve being connected to operate in two modes including:
        a) a first low flow mode in which the servo valve directly regulates the flow supplied to the engine, and
        b) a second higher flow mode in which the metering valve under the control of the servo valve regulates the flow supplied to the engine.

11. A fuel metering system as in claim 10, wherein the fuel metering system has a control slope in the low flow mode which provides higher precision than in the higher flow mode.

12. A fuel metering system as in claim 10, wherein the metering valve is in fluid communication with the servo valve so that controlling the electrical signal to the servo valve controls the degree of opening of the metering valve.

13. A fuel metering system as in claim 10, wherein the servo valve regulates the flow into a first flow path, and wherein the metering valve regulates the flow through a second flow path, fuel supplied to the engine in the first flow mode flowing solely through the first flow path, fuel supplied to the engine in the second flow mode flowing through both the first flow path and the second flow path.

14. A fuel metering system as in claim 10, wherein the first low flow mode corresponds with engine start.

15. A fuel metering system for regulating the flow of pressurized fuel between a fuel supply and a combustion chamber of an engine, the fuel metering system comprising:
    a first passageway for receiving fuel from a fuel supply;
    a second passageway for delivering fuel to a combustion chamber;
    a chamber having an inlet in fluid communication with the first passageway and an outlet in fluid communication with the second passageway, the rate of fuel flow from the chamber to the second passageway restricted to an upper limit;
    a servo valve disposed between the first passageway and chamber outlet to selectively regulate the flow of fuel from the first passageway into the chamber;
    a metering valve disposed between the first passageway and the second passageway to regulate the flow of fuel from the first passageway to the second passageway, the metering valve biased to a closed position that obstructs the fuel flow the metering valve having an actuating surface disposed in the chamber and responsive to fuel pressure in the chamber, sufficient fuel pressure in the chamber moving the metering valve from the closed position toward an open position.

16. The fuel metering system of claim 15, wherein the fuel delivered to the combustion chamber at flow rates below the upper limit flows from the first passageway to the second passageway solely through the servo valve, and wherein the fuel delivered to the combustion chamber at flow rates above the upper limit flows from the first passageway to the second passageway through both the servo valve and the metering valve.

17. The fuel metering system of claim 15, wherein the fuel pressure in the chamber reaches a sufficient level to move the metering valve towards an open position when the flow through the servo valve is approximately the upper limit or higher.

18. The fuel metering system of claim 15, wherein the metering valve is mechanically linked to the servo valve to reduce the increase in fuel flow entering the chamber through the servo valve when the metering valve moves to increasingly open positions.

19. The fuel metering system of claim 15, further comprising a nozzle fluidically connecting the first passageway and chamber inlet, the nozzle having an outlet in fluid communication with the chamber, and wherein the servo valve includes a servo actuator that moves a flapper arm, the flapper arm selectively distanced from the nozzle outlet to regulate the flow of fuel exiting the nozzle.

20. The fuel metering system of claim 15, wherein a conduit fluidically connects the outlet of the chamber and the second passageway, the conduit including a restriction orifice restricting the flow through the conduit to the upper limit.

21. The fuel metering system of claim 20, wherein the conduit is integrally provided in the metering valve.

22. The fuel metering system of claim 20, further comprising a second conduit fluidically connecting the first passageway and the second passageway to provide a supplemental flow of fuel to the combustion chamber, fuel flow through the second conduit restricted to a second upper limit.

* * * * *